United States Patent [19]
Cloyd

[11] 3,923,000
[45] Dec. 2, 1975

[54] OMNI DIRECTIONAL TELL TALE TILT INDICATOR

[75] Inventor: Harold S. Cloyd, Erie, Pa.
[73] Assignee: Nosco Plastics, Inc., Erie, Pa.
[22] Filed: July 15, 1974
[21] Appl. No.: 488,654

[52] U.S. Cl.......... 116/124 R; 33/365; 116/114 AH
[51] Int. Cl.². ............................................ G01C 9/10
[58] Field of Search.... 33/365; 116/124 R, DIG. 13, 116/114 AH

[56] References Cited
UNITED STATES PATENTS

| | | | |
|---|---|---|---|
| 2,067,474 | 1/1937 | Carbonara | 33/365 |
| 2,168,885 | 8/1939 | Rickenbach | 33/365 |
| 2,411,165 | 11/1946 | McBride | 33/365 |
| 2,826,823 | 3/1958 | Hagner | 33/365 |
| 3,041,882 | 7/1962 | Griffiths | 116/114 AH |
| 3,385,258 | 5/1968 | Curtin | 33/365 |

FOREIGN PATENTS OR APPLICATIONS
810,642  8/1951  Germany...................... 116/114 AH Primary Examiner—S. Clement Swisher
Assistant Examiner—Denis E. Corr
Attorney, Agent, or Firm—Ralph Hammar

[57] ABSTRACT

A device which indicates that an object has been tilted in any direction beyond a permitted angle. The device has a body to be mounted in fixed relation to the object whose tilt is to be measured. In the body is an upright recess holding indicating means by gravity. The recess is deep enough to prevent dislodging the indicating means by vibration and road shocks but has a rim over which the indicating means flows when the tilt of the object from the vertical exceeds a prohibited amount. The device is activated by removing a pin which holds the indicating means in the recess.

11 Claims, 10 Drawing Figures

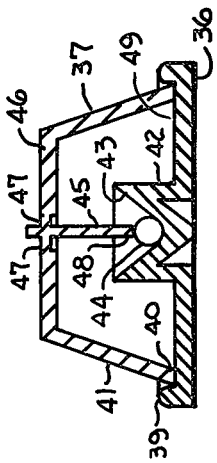
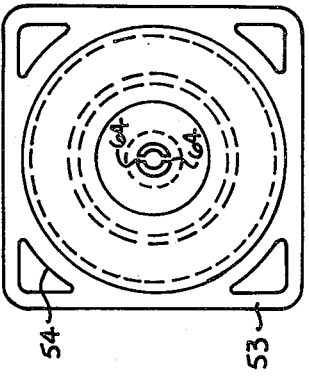
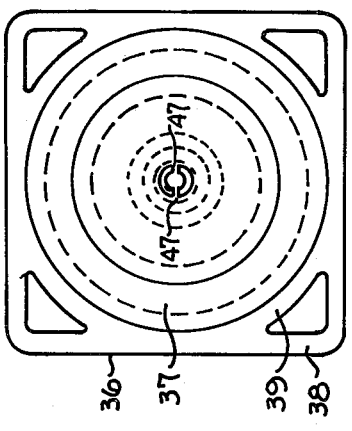
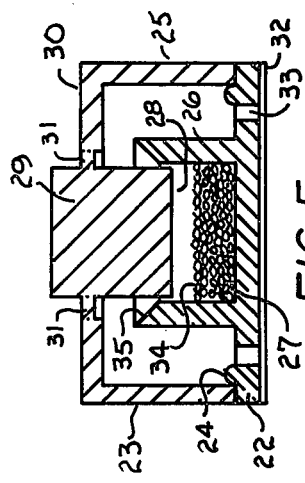
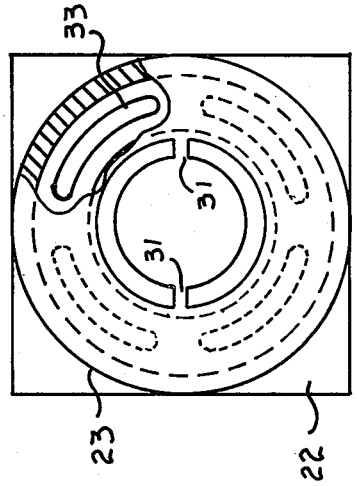
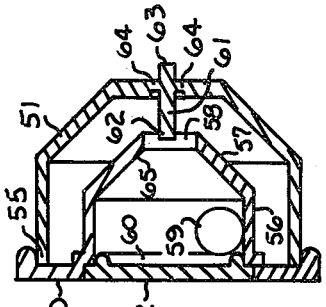
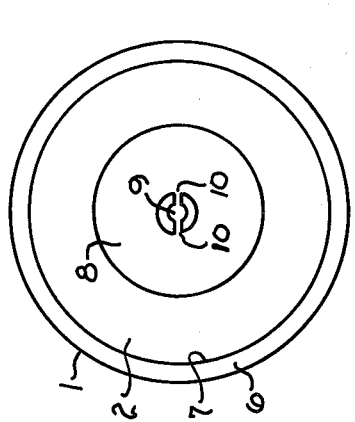
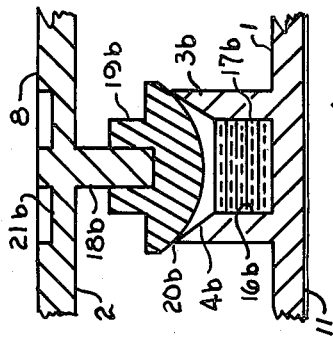

OMNI DIRECTIONAL TELL TALE TILT INDICATOR

This invention is intended to provide positive indication that an object has been tilted beyond a permitted angle.

In the drawing, FIG. 1 is a sectional elevation through a preferred form of tilt indicator; FIG. 2 is a top plan view; FIGS. 3 and 4 are fragmentary sectional elevations of modifications; FIG. 5 is a sectional elevation through another modification; FIG. 6 is a top plan view, partly broken away of FIG. 5 indicator; FIG. 7 is a sectional elevation through another modification; FIG. 8 is a top plan view of the FIG. 7 indicator; FIG. 9 is a sectional elevation through another modification; and FIG. 10 is a top plan view of the FIG. 9 indicator.

The FIGS. 1 and 2 indicator has a base 1 and a cover 2 each adapted to injection molding from thermo plastics such as polystyrene. The parts are preferably of circular shape and are quite small. The base 1, for example, may have substantially the same diameter as a dime. At the center of the base is an upstanding post 3 having an upright conical recess 4 in its upper end in which a ball 5 is held by gravity. The recess 4 is deep enough so the ball will not bounce out of the recess due to ordinary road shocks. The base has a peripheral upstanding rim 6 into which the lower end 7 of the cover 2 is seated. The lower end 7 of the cover and the adjacent underlying surfaces of the base are suitably bonded together to make a complete assembly. The cover 2 has a top wall 8 integrally molded with a pin 9 which holds the ball 5 in place in the bottom of the recess 4 until the pin is removed or broken out; for example, by breaking frangible sections 10.

In use, the base of the indicator is mounted on a horizontal surface of the object whose tilt is to be measured. This mounting may be conveniently done by double-faced adhesive tape 11 in which one side sticks to the bottom of the base and the other side sticks to the surface on which the indicator is to be mounted. After mounting, the frangible sections 10 are broken out to remove the pin 9 and the indicator is then ready for use. The ball 5 will remain seated in the socket 4 until the indicator is tilted so that the ball can roll out of the socket. This tilt may be in any direction. Once the ball rolls out of its socket, it falls into the space around the post, and cannot be returned to the socket 4 by any manipulation of the indicator. The particular indicator shown has a conical recess with sides at an angle of substantially 60° to the horizontal and will indicate tilt of a few degrees more than 60° in any direction. One use of the particular indicator is for shipping objects which should not be tilted more than a few degrees beyond 60° from the vertical. As soon as this prohibited range is exceeded, the ball 5 rolls out of the socket 4 and falls into the space around the post 3 where it serves as a tell-tale that the object has been mishandled.

In the modification of FIG. 3, only the central portion of the indicator is shown, the remaining construction being the same as in FIG. 1. Corresponding parts are indicated by the same reference numerals and the new parts are indicated by reference numerals followed by a letter a.

The post 3a integral with the bottom plate 1 has at its upper end a conical recess 4a, the lower end of which merges into a cylindrical recess 12a containing a quantity of colored beads 13a. The depth of the recess 4a is sufficient so that the beads will not bounce out due to ordinary road shocks. Prior to use, the upper end of the recess 4a is closed by a pin 14a integral with the top wall 8 of the cover 2 and connected thereto by frangible sections 15a similar to sections 10 in FIG. 2. The lower end 16a of the pin 14a is in the form of a cover making a tight enough seal against the rim 6a of the recess to prevent unwanted leakage of the beads 12a. By breaking the frangible sections, the pin 14 may be removed, thereby arming the indicator to indicate tilt through an angle to the vertical greater than the angle of sides 4a to the horizontal.

As in the FIGS. 1, 2 indicator, the bottom plate 1 is mounted on a horizontal surface, typically by double-stick adhesive 11 and upon tilting the indicator significantly beyond the inclination of the sides of the conical recess 4a to the horizontal, the colored beads run out of the recess and fall to the space around the post 3a to provide a positive indication that the surface upon which the indicator has been mounted has been tilted to an angle greater than the prohibited maximum. In the particular indicator illustrated where the sides of the recess 4a make an angle of about 60° to the horizontal, a tilt of a few more degrees more than 60° from the vertical will result in colored beads running out of the cylindrical recess 12a.

The modification of FIG. 4 differs from FIGS. 1 — 3 in the use of a colored liquid for the indicating medium and in the structural changes required. Corresponding parts are indicated by the same reference numerals and new parts are indicated by numerals followed by the letter b.

The post 3b on the upper side of the bottom plate 1 is similar to the post 3a in that it has a conical recess 4b at its upper end leading to a cylindrical recess 16b in its lower end. The depth of the recess 4b is sufficient so that a liquid 17b will not splash out of the recess under ordinary road shocks. To hold the liquid within the recess until the indicator is ready for use, a pin 18b is molded integral with the top wall 8 and the lower end of the pin carries an elastomeric sealing element 19b which in the assembled position seats on the rim 20b of the recess 4b preventing leakage until the indicator is ready for use. After the indicator has been mounted on the surface whose tilt is to be measured, for example, by double stick adhesive 11, frangible sections 21b similar to sections 10 in FIG. 1 are broken releasing the stem 18b and allowing removal of the stem and its sealing washer 19b so that the indicator is ready for use. In the particular indicator shown where the sides 4b make an angle of 60° to the horizontal, a tilt of a few degrees more than 60° from the vertical will cause the liquid to run out of the recess 16b and provide a permanent indication that the surface has been tilted beyond the permitted range.

All three indicators can be made in very small sizes with the resultant low cost and require only a single unit to provide a positive indication of tilt in all directions. By making the indicator of clear plastic, the condition of the indicator is easily observed. The indicator may be mounted directly on the object whose tilt is to be indicated or on any surface in fixed relation to the object.

The tilt indicator of FIGS. 5 and 6 has a base 22 and a cover 23, both adapted to molding from transparent or clear polystyrene. The base has an upstanding circular rib 24 which fits within the lower end of cylindrical side walls 25 of the cover. The cover may be secured to the base by a snap fit with the rib 24 or by an adhesive or solvent joint. At the center of the base is an upstanding hollow cylindrical or recess section 26 partly filled with colored beads 27. The upper end of the recess is plugged by a pin 29. The upper end of the pin is connected to the top wall 30 of the cover 23 by frangible sections 31.

In use, the indicator is mounted on a horizontal surface by means of double-faced adhesive tape 32 in fixed relation to the object whose tilt is to be indicated. One face of the tape sticks to the surface on which the indicator is to be mounted and the other surface sticks to the under side of the base. The base has a plurality of slots 33 through which the upper side of the adhesive tape 32 is exposed. After mounting, the device is armed or conditioned for use by breaking the sections 31 and removing the pin 29. As the object is tilted, the upper surface 34 of the beads remains in a substantially horizontal plane. As the angle of tilt increases, beads flow over the chamfered upper edge 35 of the recess and drop to the upper surface of the base 22. Some of the beads will fall into the slots 33 and be caught by the tacky upper surface of the adhesive tape 32 and remain as an indication that the object has been tilted through an angle greater than that at which the beads would be retained in the recess.

The indicator on FIGS. 7 and 8 has a base 36 and a cover 37, both of transparent polystyrene. The base has peripheral stiffening ribs 38 at the corners which merge into a circular rib 39 receiving the lower end 40 of the conical side walls 41 of the cover. The lower end of the cover is secured to the base by a snap fit, sonic weld, or solvent weld joint. At the center of the base is an upstanding hollow cylindrical projection 42 having at its upper end a recess formed reentrant conical walls 43 in the lower end of which is seated a metal ball 44. The ball is held in the recess by a pin 45 connected to the top wall 46 of the cover by frangible sections 47. The lower end 48 of the pin engages the ball and holds it sealted in the bottom of the recess.

In use, the unit is mounted by means of double-faced adhesive tape on a horizontal surface in fixed relation to the object whose tilt is to be indicated. The unit is conditioned for indication by removing the pin 45 by fracture of the frangible sections 47. So long as the object is not tilted, the ball 44 is held by gravity in the bottom of the recess. When the object is tilted in any direction sufficient to cause any portion of the side walls 43 of the recess to incline downwardly below a horizontal plane, the ball 4 runs out of the recess and falls onto the annular portion 49 of the base surrounding the projection 42. The ball will remain in this position as an indication that the object has been tilted through an angle greater than the inclination of the walls of the recess to the horizontal.

The indicator of FIGS. 9 and 10 is intended for mounting on a vertical surface and to indicate tilting in a single direction in a plane perpendicular to that surface. The unit has a base 50, a cover 51, and a plug 52 all of which are adapted to molding from transparent or clear polystyrene. The base has peripheral stiffening ribs 53 at the corners which merge into a circular rib 54 receiving the lower end 55 of a cylindrical section of the cover. The lower end of the cover and the base are suitably joined together by a snap fit, sonic weld, or solvent weld joint. At the center of the base is a hollow recess having cylindrical walls 56 at the lower end and converging conical walls 57 at the upper end which terminate in a central opening 58 slightly larger than the outside diameter of a ball 59. The lower end of the cylindrical wall 56 is closed by the plug which has an upstanding rib 60 telescoped within the cylindrical wall. The plug is suitably joined to the base. Prior to use, the ball is held within the recess by a pin 61 having its lower end 62 projecting into the opening 58 and having its upper end 63 accessible for removal after breaking frangible sections 64.

In use the unit is mounted on a vertical surface in fixed relation to the object whose tilt is to be measured, the mounting being by double faced adhesive. In this position, the ball 59 is held by gravity in the lowermost part of the recess. The unit is armed for indication by removing the pin 61. Thereafter, if the unit is tilted to through an angle sufficient to bring the inclination of surface 65 downward below a horizontal plane, the ball will roll out of the opening 58 and will be trapped in the space between the cover and the walls 56, 57 and remain as a permanent indication that the object has been tilted.

Since this unit measures tilt in one direction, four of the units are required to provide indication of tilt in all directions.

What is claimed is:

1. An indicator for providing a positive indication that an object has been tilted beyond a predetermined angle, comprising a hollow body for attachment in fixed relation to said object, said body having a top wall and an upright recess having a vertical axis and side walls inclined to the horizontal around said axis flaring outwardly and upwardly and terminating in a rim spaced below and presented to said top wall, indicating means held by gravity in said recess, the depth of the recess being sufficient to prevent bouncing of said indicating means out of the recess by vibration and shock during shipment, said indicating means moving out of said recess when the device is tilted from the vertical through an angle exceeding the inclination to the horizontal of said side walls, and said body having a space around said side walls and below said rim for receiving said indicating means and for preventing movement of the indicating means into the recess upon return of the recess to the upright or vertical position, and a pin connected to said top wall for holding the indicating means in the recess until the pin in removed.

2. The indicator of claim 1 in which the recess is conical.

3. The indicator of claim 1 in which the indicating means is a ball.

4. The indicator of claim 1 in which the indicating means is a plurality of beads.

5. The indicator of claim 4 in which the recess has a bead holding reservoir below said inclined walls.

6. The indicator of claim 1 in which the indicating means is a colored liquid.

7. The indicator of claim 6 in which the recess has a liquid holding reservoir below said inclined walls.

8. The indicator of claim 1 in which the top wall is of plastic and the pin is connected to the top wall by frangible sections which are broken to remove the pin.

9. The indicator of claim 1 in which the pin has a sealing washer engaging said rim for holding the indicating means in the recess.

10. The indicator of claim 1 in which the pin has a cover fitting on said rim for holding the indicating means in the recess.

11. The indicator of claim 1 in which said body comprises upper and lower plastic parts peripherally seated together with one of the parts dished to provide a hollow space between the parts, and in which the lower part has an upstanding post and the recess is in the upper end of the post, and the upper part is integral with said pin.

* * * * *